United States Patent
Grayson

(10) Patent No.: US 7,979,890 B2
(45) Date of Patent: Jul. 12, 2011

(54) SYSTEM AND METHOD FOR HANDLING PER SUBSCRIBER APPLICATION AND BEARER AUTHORIZATION IN A COMMUNICATIONS ENVIRONMENT

(75) Inventor: Mark Grayson, Maidenhead (GB)

(73) Assignee: Cisco Technology, Inc., San Jose, CA (US)

( * ) Notice: Subject to any disclaimer, the term of this patent is extended or adjusted under 35 U.S.C. 154(b) by 1008 days.

(21) Appl. No.: 11/381,263

(22) Filed: May 2, 2006

(65) Prior Publication Data

US 2006/0253892 A1 Nov. 9, 2006

Related U.S. Application Data

(60) Provisional application No. 60/677,151, filed on May 3, 2005.

(51) Int. Cl.
*H04L 9/00* (2006.01)
(52) U.S. Cl. .................................. 726/1; 726/4
(58) Field of Classification Search .................. 726/1, 2, 726/3, 4
See application file for complete search history.

(56) References Cited

U.S. PATENT DOCUMENTS

| | | | |
|---|---|---|---|
| 7,099,687 B1 * | 8/2006 | Makela et al. | 455/552.1 |
| 7,506,364 B2 * | 3/2009 | Vayman | 726/4 |
| 2002/0062379 A1 * | 5/2002 | Widegren et al. | 709/227 |
| 2003/0009580 A1 * | 1/2003 | Chen et al. | 709/231 |
| 2004/0083287 A1 * | 4/2004 | Gao et al. | 709/226 |

OTHER PUBLICATIONS

3 GPP TS, 3 rd Generation Partnership Project; Technical Specification Group Core Network; End-to-end Quality of Service (QoS) signalling flows (Release 6), Dec. 2004, Global System For Mobile Communication, V 6.2.0.*

3GPP, "3rd Generation Partnership Project; Technical Specification Group Services and System Aspects; End-to-End QoS Concept and Architecture," 3rd Generation Partnership Project (3GPP™), 3G TS 23.207 V1.0.0 (Nov. 2000), http://www.3gpp.org, 28 pgs, Nov. 17, 2000.

3GPP, "3rd Generation Partnership Project; Technical Specification Group Services and System Aspects; End-to-End QoS Concept and Architecture," 3rd Generation Partnership Project (3GPP™), 3G TS 23.207 V1.1.0 (Jan. 2001), http://www.3gpp.org, 46 pgs, Jan. 25, 2001.

3GPP, "3rd Generation Partnership Project; Technical Specification Group Services and System Aspects; End-to-End QoS Concept and Architecture," 3rd Generation Partnership Project (3GPP™), 3G TS 23.207 V1.7.3 (Jun. 2001), http://www.3gpp.org, 57 pgs, Jun. 7, 2001.

3GPP, "3rd Generation Partnership Project; Technical Specification Group Services and System Aspects; End-to-End QoS Concept and Architecture," 3rd Generation Partnership Project (3GPP™), 3G TS 23.207 V2.0.0 (Jun. 2001), http://www.3gpp.org, 51 pgs, Jun. 7, 2001.

(Continued)

*Primary Examiner* — Brandon S Hoffman
*Assistant Examiner* — Samuel Ambaye
(74) *Attorney, Agent, or Firm* — Baker Botts L.L.P.

(57) ABSTRACT

An architecture for handling per subscriber application and bearer authorization in a network environment is provided that includes an application element operable to indicate that signaling responses have been authorized at a per-subscriber application level, whereby an end user has previously established an IP session and requested an application service.

17 Claims, 1 Drawing Sheet

OTHER PUBLICATIONS

3GPP, "3rd Generation Partnership Project; Technical Specification Group Services and System Aspects; End-to-End QoS Concept and Architecture (Release 5)," 3rd Generation Partnership Project (3GPP™), 3GPP TS 23.207 V5.0.0 (Jun. 2001), http://www.3gpp.org, 50 pgs, © 2001.

3GPP, "3rd Generation Partnership Project; Technical Specification Group Services and System Aspects; End-to-End QoS Concept and Architecture (Release 5)," 3rd Generation Partnership Project (3GPP™), 3GPP TS 23.207 V5.1.0 (Oct. 2001), http://www.3gpp.org, 50 pgs, © 2001.

3GPP, "3rd Generation Partnership Project; Technical Specification Group Services and System Aspects; End-to-End QoS Concept and Architecture (Release 5)," 3rd Generation Partnership Project (3GPP™), 3GPP TS 23.207 V5.2.0 (Jan. 2002), http://www.3gpp.org, 47 pgs, © 2002.

3GPP, "3rd Generation Partnership Project; Technical Specification Group Services and System Aspects; End-to-End QoS Concept and Architecture (Release 5)," 3rd Generation Partnership Project (3GPP™), 3GPP TS 23.207 V5.3.0 (Mar. 2002), http://www.3gpp.org, 47 pgs, © 2002.

3GPP, "3rd Generation Partnership Project; Technical Specification Group Services and System Aspects; End-to-End QoS Concept and Architecture (Release 5)," 3rd Generation Partnership Project (3GPP™), 3GPP TS 23.207 V5.4.0 (Jun. 2002), http://www.3gpp.org, 47 pgs, © 2002.

3GPP, "3rd Generation Partnership Project; Technical Specification Group Services and System Aspects; End-to-End Quality of Service (QoS) Concept and Architecture (Release 5)," 3rd Generation Partnership Project (3GPP™), 3GPP TS 23.207 V5.5.0 (Sep. 2002), http://www.3gpp.org, 48 pgs, © 2002.

3GPP, "3rd Generation Partnership Project; Technical Specification Group Services and System Aspects; End-to-End Quality of Service (QoS) Concept and Architecture (Release 5)," 3rd Generation Partnership Project (3GPP™), 3GPP TS 23.207 V5.6.0 (Dec. 2002), http://www.3gpp.org, 47 pgs, © 2002.

3GPP, "3rd Generation Partnership Project; Technical Specification Group Services and System Aspects; End-to-End Quality of Service (QoS) Concept and Architecture (Release 5)," 3rd Generation Partnership Project (3GPP™), 3GPP TS 23.207 V5.7.0 (Mar. 2003), http://www.3gpp.org, 47 pgs, © 2003.

3GPP, "3rd Generation Partnership Project; Technical Specification Group Services and System Aspects; End-to-End Quality of Service (QoS) Concept and Architecture (Release 5)," 3rd Generation Partnership Project (3GPP™), 3GPP TS 23.207 V5.8.0 (Jun. 2003), http://www.3gpp.org, 47 pgs, © 2003.

3GPP, "3rd Generation Partnership Project; Technical Specification Group Services and System Aspects; End-to-End Quality of Service (QoS) Concept and Architecture (Release 5)," 3rd Generation Partnership Project (3GPP™), 3GPP TS 23.207 V5.9.0 (Mar. 2004), http://www.3gpp.org, 48 pgs, © 2004.

3GPP, "3rd Generation Partnership Project; Technical Specification Group Services and System Aspects; End-to-End Quality of Service (QoS) Concept and Architecture," 3rd Generation Partnership Project (3GPP™), 3GPP TS 23.207 V5.10.0 (Sep. 2005), http://www.3gpp.org, 46 pgs, © 2005.

3GPP, "3rd Generation Partnership Project; Technical Specification Group Services and System Aspects; End-to-End Quality of Service (QoS) Concept and Architecture (Release 6)," 3rd Generation Partnership Project (3GPP™), 3GPP TS 23.207 V6.0.0 (Sep. 2003), http://www.3gpp.org, 48 pgs, © 2003.

3GPP, "3rd Generation Partnership Project; Technical Specification Group Services and System Aspects; End-to-End Quality of Service (QoS) Concept and Architecture (Release 6)," 3rd Generation Partnership Project (3GPP™), 3GPP TS 23.207 V6.1.0 (Dec. 2003), http://www.3gpp.org, 48 pgs, © 2003.

3GPP, "3rd Generation Partnership Project; Technical Specification Group Services and System Aspects; End-to-End Quality of Service (QoS) Concept and Architecture (Release 6)," 3rd Generation Partnership Project (3GPP™), 3GPP TS 23.207 V6.1.1 (Jan. 2004), http://www.3gpp.org, 50 pgs, © 2004.

3GPP, "3rd Generation Partnership Project; Technical Specification Group Services and System Aspects; End-to-End Quality of Service (QoS) Concept and Architecture (Release 6)," 3rd Generation Partnership Project (3GPP™), 3GPP TS 23.207 V6.2.0 (Mar. 2004), http://www.3gpp.org, 52 pgs, © 2004.

3GPP, "3rd Generation Partnership Project; Technical Specification Group Services and System Aspects; End-to-End Quality of Service (QoS) Concept and Architecture (Release 6)," 3rd Generation Partnership Project (3GPP™), 3GPP TS 23.207 V6.3.0 (Jun. 2004), http://www.3gpp.org, 53 pgs, © 2004.

3GPP, "3rd Generation Partnership Project; Technical Specification Group Services and System Aspects; End-to-End Quality of Service (QoS) Concept and Architecture (Release 6)," 3rd Generation Partnership Project (3GPP™), 3GPP TS 23.207 V6.4.0 (Sep. 2004), http://www.3gpp.org, 53 pgs, © 2004.

3GPP, "3rd Generation Partnership Project; Technical Specification Group Services and System Aspects; End-to-End Quality of Service (QoS) Concept and Architecture (Release 6)," 3rd Generation Partnership Project (3GPP™), 3GPP TS 23.207 V6.5.0 (Jun. 2005), http://www.3gpp.org, 53 pgs, © 2005.

3GPP, "3rd Generation Partnership Project; Technical Specification Group Services and System Aspects; End-to-End Quality of Service (QoS) Concept and Architecture (Release 6)," 3rd Generation Partnership Project (3GPP™), 3GPP TS 23.207 V6.6.0 (Sep. 2005), http://www.3gpp.org, 53 pgs, © 2005.

3GPP, "3rd Generation Partnership Project; Technical Specification Group CN; End-to-End QoS Signalling Flows (Release 5)," 3rd Generation Partnership Project (3GPP™), 3GPP TS 29.208 V0.1.0 (Oct. 2001), http://www.3gpp.org, 17 pgs, © 2001.

3GPP, "3rd Generation Partnership Project; Technical Specification Group CN; End-to-End QoS Signalling Flows (Release 5)," 3rd Generation Partnership Project (3GPP™), 3GPP TS 29.208 V0.2.0 (Nov. 2001), http://www.3gpp.org, 13 pgs, © 2002.

3GPP, "3rd Generation Partnership Project; Technical Specification Group CN; End-to-End QoS Signalling Flows (Release 5)," 3rd Generation Partnership Project (3GPP™) 3GPP TS 29.208 V0.3.1 (Feb. 2002), http://www.3gpp.org, 17 pgs, © 2002.

3GPP, "3rd Generation Partnership Project; Technical Specification Group CN; End-to-End QoS Signalling Flows (Release 5)," 3rd Generation Partnership Project (3GPP™), 3GPP TS 29.208 V1.0.0 (Feb. 2002), http://www.3gpp.org, 18 pgs, © 2002.

3GPP, "3rd Generation Partnership Project; Technical Specification Group CN; End-to-End QoS Signalling Flows (Release 5)," 3rd Generation Partnership Project (3GPP™), 3GPP TS 29.208 V1.1.0 (Apr. 2002), http://www.3gpp.org, 24 pgs, © 2002.

3GPP, "3rd Generation Partnership Project; Technical Specification Group Core Network; End-to-End Quality of Service (QoS) Signalling Flows (Release 5)," 3rd Generation Partnership Project (3GPP™), 3GPP TS 29.208 V2.0.0 (2002-00), http://www.3gpp.org, 25 pgs, © 2002.

3GPP, "3rd Generation Partnership Project; Technical Specification Group Core Network; End-to-End QoS Signalling Flows (Release 5)," 3rd Generation Partnership Project (3GPP™), 3GPP TS 29.208 V5.0.0 (Jun. 2002), http://www.3gpp.org, 25 pgs, © 2002.

3GPP, "3rd Generation Partnership Project; Technical Specification Group Core Network; End-to-End QoS Signalling Flows (Release 5)," 3rd Generation Partnership Project (3GPP™), 3GPP TS 29.208 V5.1.0 (Sep. 2002), http://www.3gpp.org, 28 pgs, © 20042.

3GPP, "3rd Generation Partnership Project; Technical Specification Group Core Network; End-to-End QoS Signalling Flows (Release 5)," 3rd Generation Partnership Project (3GPP™), 3GPP TS 29.208 V5.2.0 (Dec. 2002), http://www.3gpp.org, 25 pgs, © 2002.

3GPP, "3rd Generation Partnership Project; Technical Specification Group Core Network; End-to-End QoS Signalling Flows (Release 5)," 3rd Generation Partnership Project (3GPP™), 3GPP TS 29.208 V5.3.0 (Mar. 2003), http://www.3gpp.org, 26 pgs, © 2003.

3GPP, "3rd Generation Partnership Project; Technical Specification Group Core Network; End-to-End QoS Signalling Flows (Release 5)," 3rd Generation Partnership Project (3GPP™), 3GPP TS 29.208 V5.3.1 (Apr. 2003), http://www.3gpp.org, 26 pgs, © 2003.

3GPP, "3rd Generation Partnership Project; Technical Specification Group Core Network; End-to-End QoS Signalling Flows (Release 5)," 3rd Generation Partnership Project (3GPP™), 3GPP TS 29.208 V5.4.0 (Jun. 2003), http://www.3gpp.org, 26 pgs, © 2003.

3GPP, "3rd Generation Partnership Project; Technical Specification Group Core Network; End-to-End QoS Signalling Flows (Release 5)," 3rd Generation Partnership Project (3GPP™), 3GPP TS 29.208 V5.5.0 (Sep. 2003), http://www.3gpp.org, 32 pgs, © 2003.

3GPP, "3rd Generation Partnership Project; Technical Specification Group Core Network; End-to-End QoS Signalling Flows (Release 5)," 3rd Generation Partnership Project (3GPP™), 3GPP TS 29.208 V5.5.1 (Oct. 2003), http://www.3gpp.org, 32 pgs, © 2003.

3GPP, "3rd Generation Partnership Project; Technical Specification Group Core Network; End-to-End QoS Signalling Flows (Release 5)," 3rd Generation Partnership Project (3GPP™), 3GPP TS 29.208 V5.6.0 (Dec. 2003), http://www.3gpp.org, 32 pgs, © 2003.

3GPP, "3rd Generation Partnership Project; Technical Specification Group Core Network; End-to-End QoS Signalling Flows (Release 5)," 3rd Generation Partnership Project (3GPP™), 3GPP TS 29.208 V5.7.0 (Mar. 2004), http://www.3gpp.org, 32 pgs, © 2004.

3GPP, "3rd Generation Partnership Project; Technical Specification Group Core Network; End-to-End QoS Signalling Flows (Release 5)," 3rd Generation Partnership Project (3GPP™), 3GPP TS 29.208 V5.8.0 (Jun. 2004), http://www.3gpp.org, 33 pgs, © 2004.

3GPP, "3rd Generation Partnership Project; Technical Specification Group Core Network; End-to-End QoS Signalling Flows (Release 5)," 3rd Generation Partnership Project (3GPP™) 3GPP TS 29.208 V5.9.0 (Dec. 2004), http://www.3gpp.org, 33 pgs, © 2004.

3GPP, "3rd Generation Partnership Project; Technical Specification Group Core Network; End-to-End QoS Signalling Flows (Release 6)," 3rd Generation Partnership Project (3GPP™), 3GPP TS 29.208 V6.0.0 (Jun. 2004), http://www.3gpp.org, 32 pgs, © 2004.

3GPP, "3rd Generation Partnership Project; Technical Specification Group Core Network; End-to-End QoS Signalling Flows (Release 6)," 3rd Generation Partnership Project (3GPP™), 3GPP TS 29.208 V6.1.0 (Sep. 2004), http://www.3gpp.org, 50 pgs, © 2004.

3GPP, "3rd Generation Partnership Project; Technical Specification Group Core Network; End-to-End QoS Signalling Flows (Release 6)," 3rd Generation Partnership Project (3GPP™), 3GPP TS 29.208 V6.2.0 (Dec. 2004), http://www.3gpp.org, 52 pgs, © 2004.

3GPP, "3rd Generation Partnership Project; Technical Specification Group Core Network; End-to-End QoS Signalling Flows (Release 6)," 3rd Generation Partnership Project (3GPP™), 3GPP Ts 29.208 V6.2.1 (Jan. 2005), http://www.3gpp.org, 53 pgs, © 2005.

3GPP, "3rd Generation Partnership Project; Technical Specification Group Core Network; End-to-End QoS Signalling Flows (Release 6)," 3rd Generation Partnership Project (3GPP™), 3GPP TS 29.208 V6.3.0 (Mar. 2005), http://www.3gpp.org, 53 pgs, © 2005.

3GPP, "3rd Generation Partnership Project; Technical Specification Group Core Network and Terminals; End-to-End QoS Signalling Flows (Release 6)," 3rd Generation Partnership Project (3GPP™), 3GPP TS 29.208 V6.4.0 (Jun. 2005), http://www.3gpp.org, 53 pgs, © 2005.

3GPP, "3rd Generation Partnership Project; Technical Specification Group Core Network and Terminals; End-to-End QoS Signalling Flows (Release 6)," 3rd Generation Partnership Project (3GPP™), 3GPP TS 29.208 V6.5.0 (Sep. 2005), http://www.3gpp.org, 53 pgs, © 2005.

3GPP, "3rd Generation Partnership Project; Technical Specification Group Core Network and Terminals; End-to-End QoS Signalling Flows (Release 6)," 3rd Generation Partnership Project (3GPP™), 3GPP TS 29.208 V6.6.0 (Dec. 2005), http://www.3gpp.org, 53 pgs, © 2005.

3GPP, "3rd Generation Partnership Project; Technical Specification Group Core Network and Terminals; End-to-End QoS Signalling Flows (Release 6)," 3rd Generation Partnership Project (3GPP™), 3GPP TS 29.208 V6.1.1 (Mar. 2006), http://www.3gpp.org, 53 pgs, © 2006.

3GPP, "3rd Generation Partnership Project; Technical Specification Group Core Network; Policy Control over Gq Interface (Release 6)," 3rd Generation Partnership Project (3GPP™), 3GPP TS 29.209 V0.0.1 (Aug. 2003), http://www.3gpp.org, 11 pgs, © 2002.

3GPP, "3rd Generation Partnership Project; Technical Specifications Group Core Network; Policy Control over Gq Interface (Release 6),"

3rd Generation Partnership Project (3GPP™), 3GPP TS 29.209 V0.0.2 (Mar. 2004), http://www.3gpp.org, 17 pgs, © 2002.

3GPP, "3rd Generation Partnership Project; Technical Specifications Group Core Network; Policy Control over Gq Interface (Release 6)," 3rd Generation Partnership Project (3GPP™), Draft 3GPP TS 29.209 V0.1.0 (Apr. 2004), http://www.3gpp.org, 18 pgs, © 2002.

3GPP, "3rd Generation Partnership Project; Technical Specifications Group Core Network; Policy Control over Gq Interface (Release 6)," 3rd Generation Partnership Project (3GPP™), 3GPP TS 29.209 V1.0.0 (May 2004), http://www.3gpp.org, 23 pgs, © 2002.

3GPP, "3rd Generation Partnership Project; Technical Specifications Group Core Network; Policy Control over Gq Interface (Release 6)," 3rd Generation Partnership Project (3GPP™), 3GPP TS 29.209 V2.0.0 (Aug. 2004), http://www.3gpp.org, 25 pgs, © 2002.

3GPP, "3rd Generation Partnership Project; Technical Specifications Group Core Network; Policy Control over Gq Interface (Release 6)," 3rd Generation Partnership Project (3GPP™), 3GPP TS 29.209 V2.0.2 (Sep. 2004), http://www.3gpp.org, 24 pgs, © 2004.

3GPP, "3rd Generation Partnership Project; Technical Specifications Group Core Network; Policy Control over Gq Interface (Release 6)," 3rd Generation Partnership Project (3GPP™), 3GPP TS 29.209 V6.0.0 (Sep. 2004), http://www.3gpp.org, 24 pgs, © 2004.

3GPP, "3rd Generation Partnership Project; Technical Specifications Group Core Network; Policy Control over Gq Interface (Release 6)," 3rd Generation Partnership Project (3GPP™), 3GPP TS 29.209 V6.1.0 (Dec. 2004), http://www.3gpp.org, 24 pgs, © 2004.

3GPP, "3rd Generation Partnership Project; Technical Specifications Group Core Network; Policy Control over Gq Interface (Release 6)," 3rd Generation Partnership Project (3GPP™), 3GPP TS 29.209 V6.2.0 (Mar. 2005), http://www.3gpp.org, 24 pgs, © 2005.

3GPP, "3rd Generation Partnership Project; Technical Specifications Group Core Network and Terminals; Policy Control over Gq Interface (Release 6)," 3rd Generation Partnership Project (3GPP™), 3GPP TS 29.209 V6.3.1 (Jun. 2005), http://www.3gpp.org, 24 pgs, © 2005.

3GPP, "3rd Generation Partnership Project; Technical Specifications Group Core Network and Terminals; Policy Control over Gq Interface (Release 6)," 3rd Generation Partnership Project (3GPP™), 3GPP TS 29.209 V6.4.0 (Sep. 2005), http://www.3gpp.org, 24 pgs, © 2005.

3GPP, "3rd Generation Partnership Project; Technical Specifications Group Services and System Aspects; Architectural Enhancements for End-to-End Quality of Service (QoS) (Release x)," 3rd Generation Partnership Project (3GPP™), 3GPP TR 23.802 V0.0.0 (Aug. 2004), http://www.3gpp.org, 8 pgs, © 2004.

3GPP, "3rd Generation Partnership Project; Technical Specifications Group Services and System Aspects; Architectural Enhancements for End-to-End Quality of Service (QoS) (Release x)," 3rd Generation Partnership Project (3GPP™), 3GPP TR 23.802 V0.2.0 (Oct. 2004), http://www.3gpp.org, 18 pgs, © 2004.

3GPP, "3rd Generation Partnership Project; Technical Specifications Group Services and System Aspects; Architectural Enhancements for End-to-End Quality of Service (QoS) (Release x)," 3rd Generation Partnership Project (3GPP™), 3GPP TR 23.802 V0.3.0 (Nov. 2004), http://www.3gpp.org, 25 pgs, © 2004.

3GPP, "3rd Generation Partnership Project; Technical Specifications Group Services and System Aspects; Architectural Enhancements for End-to-End Quality of Service (QoS) (Release x)," 3rd Generation Partnership Project (3GPP™), 3GPP TR 23.802 V0.4.0 (Feb. 2005), http://www.3gpp.org, 34 pgs, © 2004.

3GPP, "3rd Generation Partnership Project; Technical Specifications Group Services and System Aspects; Architectural Enhancements for End-to-End Quality of Service (QoS) (Release x)," 3rd Generation Partnership Project (3GPP™), 3GPP TR 23.802 V0.6.0 (May 2005), http://www.3gpp.org, 45 pgs, © 2004.

3GPP, "3rd Generation Partnership Project; Technical Specifications Group Services and System Aspects; Architectural Enhancements for End-to-End Quality of Service (QoS) (Release 7)," 3rd Generation Partnership Project (3GPP™), 3GPP TR 23.802 V1.0.0 (May 2005), http://www.3gpp.org, 45 pgs, © 2005.

3GPP, "3rd Generation Partnership Project; Technical Specifications Group Services and System Aspects; Architectural Enhancements for End-to-End Quality of Service (QoS) (Release 7)," 3rd Generation Partnership Project (3GPP™), 3GPP TR 23.802 V1.1.0 (Jul. 2005), http://www.3gpp.org, 57 pgs, © 2005.

3GPP, "3rd Generation Partnership Project; Technical Specifications Group Services and System Aspects; Architectural Enhancements for End-to-End Quality of Service (QoS) (Release 7)," 3rd Generation Partnership Project (3GPP™), 3GPP TR 23.802 V1.2.0 (Sep. 2005), http://www.3gpp.org, 57 pgs, © 2005.

3GPP, "3rd Generation Partnership Project; Technical Specifications Group Services and System Aspects; Architectural Enhancements for End-to-End Quality of Service (QoS) (Release 7)," 3rd Generation Partnership Project (3GPP™), 3GPP TR 23.802 V2.0.0 (Sep. 2005), http://www.3gpp.org, 57 pgs, © 2005.

3GPP, "3rd Generation Partnership Project; Technical Specifications Group Services and System Aspects; Architectural Enhancements for End-to-End Quality of Service (QoS) (Release 7)," 3rd Generation Partnership Project (3GPP™), 3GPP TR 23.802 V7.0.0 (Sep. 2005), http://www.3gpp.org, 57 pgs, © 2005.

* cited by examiner

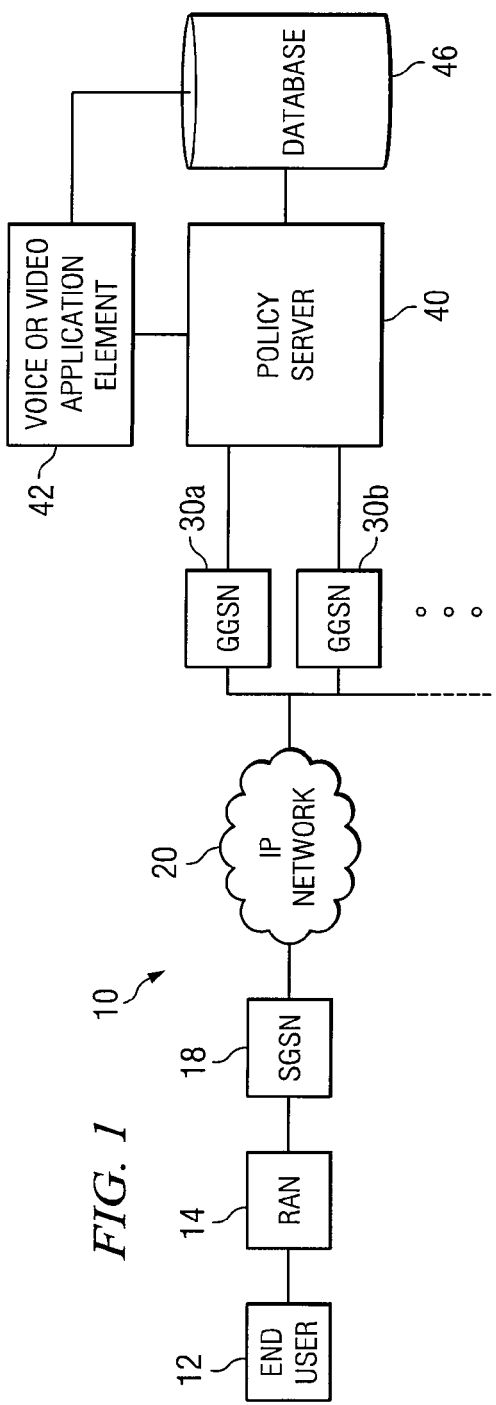
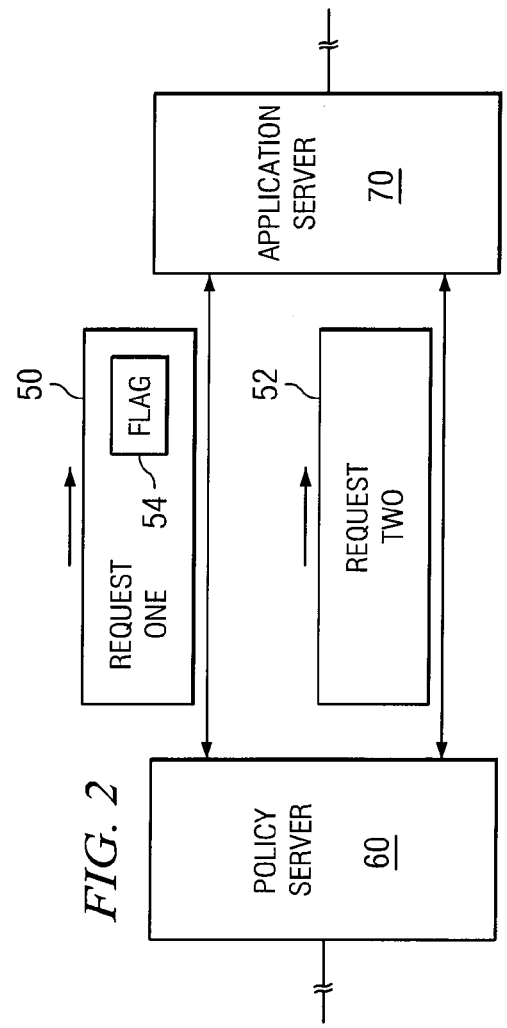

US 7,979,890 B2

SYSTEM AND METHOD FOR HANDLING PER SUBSCRIBER APPLICATION AND BEARER AUTHORIZATION IN A COMMUNICATIONS ENVIRONMENT

This Application claims priority under 35 U.S.C. §119 of provisional application No. 60/677,151 filed May 3, 2005, entitled "System and Method for Handling Per Subscriber Application and Bearer authorization in a Communications Environment."

TECHNICAL FIELD OF THE INVENTION

This invention relates in general to the field of communications, and, more particularly, to a system and a method for handling per subscriber application and bearer authorization in a communications environment.

BACKGROUND OF THE INVENTION

Networking architectures have grown increasingly complex in communications environments. In addition, the augmentation of clients or end users wishing to communicate in a network environment has caused many networking configurations and systems to respond by adding elements to accommodate the increase in networking traffic. Communication tunnels or links may be used in order to establish or to gain access to a network, whereby an end user or an object may initiate a tunneling protocol by invoking a selected location or a network node. The network node or central location may then provide a platform that the end user may use to conduct a communication session.

As the subscriber base of end users increases, proper routing and efficient management of communication sessions and data flows becomes even more critical. Having access to, or being aware of, accurate network node activity is important for executing proper routing techniques. In cases where improper routing protocols are executed, certain network components are not being optimized. Designing an effective application configuration for any network architecture provides a significant challenge to component manufacturers, system administrators, and network operators.

SUMMARY OF THE INVENTION

From the foregoing, it may be appreciated by those skilled in the art that a need has arisen for an improved communications approach that provides for an optimal application configuration for one or more end users. In accordance with one embodiment of the present invention, a system and a method for handling subscriber application and bearer authorization in a communications environment are provided that greatly reduce disadvantages and problems associated with conventional network routing techniques.

According to one embodiment of the present invention, an architecture for handling subscriber application and bearer authorization in a network environment is provided that includes an application element operable to indicate (for example dynamically) that signaling responses have been authorized at a per-subscriber application level, whereby an end user has previously established an Internet Protocol (IP) session and requested an application service.

In more particular embodiments, configuration of per-subscriber application level authorization can be statically configured on the application element. The application element can signal to a policy server that resource reservation and commit requests have been authorized at an application level.

In still more particular embodiments, the policy server can communicate with a database that is operable to offer a per-subscriber bearer level resource policy repository. In addition, the policy server is operable to over-rule a per-subscriber bearer level policy with a per-subscriber application level policy where the application level policy, is indicated to have been previously authorized at an application level.

In yet other specific embodiments, the policy server is operable to negotiate a per-subscriber application level policy with a per-subscriber bearer level policy, where the application level policy is indicated to have been not received authorized at an application level. The policy server can be in communication with a policy enforcement point to implement a policy according to a combination of application and bearer level resource requests.

Some embodiments of the present invention may provide a number of technical advantages. For example, according to one embodiment of the present invention a communications approach is provided that optimally supports bearer level and application level resource requests. This augments system performance and enhances the end user's network experience.

Certain embodiments of the present invention may enjoy some, all, or none of these advantages. Other technical advantages may be readily apparent to one skilled in the art from the following figure, description, and claims.

BRIEF DESCRIPTION OF THE DRAWINGS

To provide a more complete understanding of the present invention and features and advantages thereof, reference is made to the following description, taken in conjunction with the accompanying figure, wherein like reference numerals represent like parts, in which:

FIG. 1 is a simplified block diagram of a communications system for handling per subscriber application and bearer authorization in a communications environment in accordance with one embodiment of the present invention; and FIG. 2 is a simplified block diagram illustrating additional details associated with an example architect and, further, offers a simple flow according to the teachings of one embodiment of the invention.

DETAILED DESCRIPTION OF EXAMPLE EMBODIMENTS OF THE INVENTION

FIG. 1 is a simplified block diagram of a communication system 10 for communicating data in a network environment and, further, for supporting bearer level and application level resource requests. Communication system 10 includes an end user 12, a radio access network (RAN) 14, a serving general packet radio service (GPRS) support node (SGSN) 18, and GPRS internet protocol (IP) network 20. Additionally, communication system 10 may include multiple gateway GPRS support nodes (GGSNs) 30a-b. Communication system 10 may also include a policy server 40, which is coupled to a voice or video application element 42 and a database 46, which also has connectivity to voice or video application element 42.

FIG. 1 may be generally configured or arranged to represent 2.5G communication architecture applicable to a Global System for Mobile (GSM) environment in accordance with a particular embodiment of the present invention. However, the 2.5G architecture is offered for purposes of example only and may alternatively be substituted with any suitable networking protocol or arrangement that provides a communicative platform for communication system 10. For example, communication system 10 may cooperate with any version of a GPRS tunneling protocol (GTP) that includes application operations. This may be inclusive of first generation, 2G, and 3G architectures that provide features for application distribution.

In accordance with the teachings of the present invention, communication system 10 provides: 1) a technique that allows an application element (e.g. an application server) to dynamically indicate to an acting application proxy that signaling responses have been authorized at a per-subscriber application level; 2) a technique where the configuration of per-subscriber application level authorization can be statically configured on an application function; 3) a technique following (1) and (2) by which an application function can signal a policy server that resource reservation and commit requests have been authorized at the application level; 4) a technique whereby a policy server is in communication with a per-subscriber bearer level resource policy repository; 5) a technique whereby a policy server is operative to over-rule a per-subscriber bearer level policy with a per-subscriber application level policy where the application level policy is indicated to have been previously authorized at the application level; 6) a technique whereby a policy server is operative to down-negotiate a per-subscriber application level policy with a per-subscriber bearer level policy, where the application level policy is indicated to have been not received authorized at the application level; and 7) a technique by which the policy server is in communication with a policy enforcement point to implement a given policy according to the combination of application and bearer level resource requests. Such operations can provide a number of capabilities to a network, such as the ability to optimally support bearer level and application level resource requests.

Note that for purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

In 3GPP release 6, an architecture is defined whereby an application function can request resources be reserved and/or committed on its behalf in order to support a particular flow or set of flows corresponding to the delivery of an application service. In 3GPP release 6, the resources requested by an application function can be down-negotiated (for example) because of insufficient resources at the GGSN. In 3GPPP release 7, a new interface is defined between the policy server and a subscriber policy repository for recovering per subscriber bearer level quality of service. In 3GPPP release 6, a user may have to authenticate himself within an application framework prior to receiving service. This authentication may then trigger profile downloading, which defines what applications and service the user may receive at an application level. Missing from such operations is the ability to determine how to handle per subscriber application resource requests, which conflict with per-subscriber bearer level resource authorization.

In accordance with the architecture of communication system 10, a protocol is defined that allows for independent per-subscriber application level resource authorization and per-subscriber bearer level resource authorization. An application function (e.g. voice or video application element 42), which can signal to policy server 40 to commit and/or reserve resources on behalf of a user, will include in a given request an explicit indication of whether such resources have been authorized at the application level. Authorization at the application level may entail application level user authorization (for example SIP Digest: AKA authentication in an IMS environment) and may entail the recovery of per-user application level authorization information (e.g., recovery of a maximum per subscriber allowed SDP from a home subscriber server (HSS) [which is not shown explicitly, but which could be incorporated into several of the components of FIG. 1 or provided separately] to a S-CSCF in an IMS environment over the Cx interface, or the recovery of an application specific authorization over the Sh interface).

An application function may be pre-configured with static information concerning whether all resource requests have been authorized or per-subscriber authorization information may be passed in-band using signaling between the S-CSCF and the P-CSCF. When the application function requests resources to be reserved or committed for a particular user flow, it can include information as to whether this request corresponds to an authorized application.

When policy server 40 receives an application resource reservation/commit request, it can analyze the authorization information. If application level authorization is not indicated, then the policy server can use the per-subscriber bearer level policy to optionally down-negotiate the requested application level requests. If the application level authorization is indicated, then policy server 40 will ignore the per-subscriber bearer level policy information.

Turning now to the infrastructure of FIG. 1, end user 12 is a client or a customer wishing to initiate a communication in communication system 10 via IP network 20. End user 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

RAN 14 is a communications interface between end user 12 and SGSN 18. RAN 14 may comprise a base transceiver station and a base station controller. The communications interface provided by RAN 14 offers connectivity and allows data to be exchanged between end user 12 and any number of selected elements within communication system 10. RAN 14 facilitates the delivery of a request packet generated by end user 12 and the reception of information sought by end user 12. RAN 14 is only one example of a communications interface between end user 12 and SGSN 18. Other types of communications interfaces may be used for a desired network design based on particular needs.

IP network 20 represents a series of points or nodes of interconnected communication paths for receiving and transmitting packets of information that propagate through communication system 10. IP network 20 offers a communicative interface between end user 12 and selected GGSNs 30a-b and may be any local area network (LAN), wireless local area network (WLAN), metropolitan area network (MAN), wide area network (WAN), virtual private network (VPN), or any other appropriate architecture or system that facilitates communications in a network environment. IP network 20 implements a user datagram protocol (UDP)/internet protocol (UDP/IP) communication language protocol in a particular embodiment of the present invention. However, IP network 20 may alternatively implement any other suitable communication protocol for transmitting and receiving data or information within communication system 10.

SGSN 18 and GGSNs 30a-b are network elements that cooperate in order to facilitate a communication session involving end user 12. GGSNs 30a-b are communications or network nodes that may be working in conjunction with multiple SGSNs 18 to provide a communications medium in a GPRS service network environment in communicating data exchanges within communication system 10. GPRS represents a packet-based data bearer service for communication services that may be delivered as a network overlay for any type of suitable network configuration or platform. GPRS generally applies packet-radio and packet switching principles to transfer data packets in an efficient way between GSM elements or units and external packet data networks. GPRS may support multiple internet communication protocols and may enable existing IP, X.25, or any other suitable applications or platforms to operate over GSM connections.

In one embodiment, policy server 40 and voice or video application element 42 are servers or processors that can interact in order to achieve the handling per subscriber application and bearer authorization features, as described herein. It should also be noted that the internal structure of these components is malleable and can be readily changed, modified, rearranged, or reconfigured in order to achieve their intended operations as they pertain to the functions described herein. In other embodiments, either policy server 40 or voice or video application element 42 is any suitable component (e.g. a gateway, a switch, a router, a bridge, a state machine, etc.) that is operable to interface with end user 12, endpoints/end-user devices, etc.

Software and/or hardware may reside in policy server 40 and/or voice or video application element 42 in order to achieve the teachings of the signaling features of the present invention. However, due to their flexibility, these components may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of policy server 40 and voice or video application element 42 in the context of communication system 10 and, accordingly, they should be construed as such.

It should be noted that the internal structure of the system of FIG. 1 is versatile and can be readily changed, modified, rearranged, or reconfigured in order to achieve its intended operations or additional operations. Additionally, any of the items within FIG. 1 may be combined, where appropriate, or replaced with other functional elements that are operable to achieve any of the operations described herein.

FIG. 2 is a simplified block diagram illustrating additional details associated with an example architecture and, further, offers a simple flow according to the teachings of one embodiment of the invention. FIG. 2 includes a policy server 60 and an application server 70. These two components can achieve intercommunications, as a request one (50) and a request two (52) may freely propagate between these devices. A flag 54 is provided in request one 50; its significance is detailed below. It should also be noted that the operations (as described below) extend to FIG. 1 as well, and vice versa such that the operations described above can be applicable to FIG. 2 where appropriate.

Before proceeding to the example flow of FIG. 2, some preliminary information is offered in an attempt to better guide and enlighten the audience. The identification of specific protocols or signaling is not limiting, as it is only offered in earnest to teach or better explain some (but not all) of the applications of the present invention. Current standardization does not address the ability to authorize at the application layer and at the bearer layer. For example, current techniques generally will not be able to differentiate a user requesting 4 Mb/s service to view a movie, or a 4 Mb/s service to access (vanilla) Internet. From an authorization perspective, these are seen identically from the PDF and gateway perspective. The only way then to "virtually not authorize" the 4 Mb/s Internet service is to tariff it exorbitantly.

R7 can include per user bearer authorization, but as highlighted above, will not be able to intelligently decide whether the request is from an authorized application or an off-net service. Communication system 10 allows the policy decision not just be based on bandwidth requested by the user, but also based on an indication that this bandwidth is associated with an authorized application. This, in turn, allows an operator to admit the request for 4 Mb/s service when it is associated with an authorized application, but deny it when it is not associated with an application.

The role of the policy server in IP-NGN (next generation network) is critical in its ability to offer differentiated packet handling and charging of service data flows passing through an access gateway. The typical policy server has an interface to a policy repository, which contains bearer specific policy rules for an individual subscriber, e.g., gold/silver/bronze classifications, which can then be mapped to peak and/or mean bandwidths available to a particular user.

Such a policy server relegates the access provider to a pipe (albeit that the size of the pipe can be varied between users). IP NGN is about more than pipes and, importantly, is about how to couple applications to the IP fabric to enable the access gateway to differentially handle service data flows, not simple aggregates.

The definition of a service data flow is originated at an application function. This will typically define a 5 tuple or even perhaps a content rule for an application specific service data flow. Following standard NGN architectures, this information will be passed from application function to policy server (e.g., using the 3GPPP Rx interface). The policy server will then consult the policy repository (e.g., using the 3GPPP SP interface) before configuring the access gateway to support the service data flow with the required quality of service and charging handling (e.g., using the 3GPPP Gx interface). 3GPPP IMS defines application specific authorization using the "subscribedmediaprofile."

From a system perspective, a superior quality of experience will be realized if a media flow, which has been authorized at the application layer, e.g., using the subscribed media profile stored for a user in the HSS, is not subsequently rejected or downgraded by the policy server. Communication system 10 utilizes flag 54 in the request (request one 50, as illustrated) between application server 70 and policy server 60 to specifically indicate whether a request has been authorized at the application layer or whether bearer policy rules should apply.

This then allows policy server 60 to differentiate two requests (request one 50 vs. request two 52) for a 5 tuple media flow: one requesting 100 kbit/s streaming service, which has been indicated as being authorized in the HSS, e.g., because the network operator has offered a SIP based streaming service, and another request for a 5 tuple media flow for 50 kbit/s streaming service, which (because of per subscriber bearer limits) is subsequently downgraded to the users "over-the-top" bearer rate limit of 25 kbit/s. The aforementioned parameters can be varied considerably or other parameters can be accommodated by the present invention.

Some of the steps discussed with reference to FIG. 2 may be changed or deleted where appropriate and additional steps may also be added process flows. These changes may be based on specific communication architectures or particular interfacing arrangements and configurations of associated elements and do not depart from the scope or the teachings of the present invention.

Although the present invention has been described in detail with reference to particular embodiments, communication system 10 may be extended to any scenario in which end user 12 is provided with application options in the context of a wired or a wireless connection or coupling. This may also be extended to any other network architectures and include communications with any type of access server (e.g. a network access server (NAS), foreign agents, etc.). End user 12 may use a dedicated connection of some form or use forms of multiple access protocols where appropriate. Access may be associated with a point to point protocol (PPP) architecture or alternatively with layer three protocols over a layer two protocol in accordance with particular needs.

Moreover, significant flexibility is provided by communication system 10 in that any suitable one or more components may be replaced with other components that facilitate their operations. For example, RAN 14 and SGSN 18 may be replaced by an access network or by a packet data serving node (PDSN). GGSNs 30a and 30b may be replaced by a home agent or a NAS where appropriate, as identified above.

Additionally, although described in specific environments and contexts, the present invention could be used in countless applications, such as in edge proxies or other application functions. The present invention could also be used in conjunction with GGSNs if (or when) a policy server collapses onto gateway element. Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus comprising:
one or more processors operable to:
receive authorization information from an application element, the authorization information indicating whether one or more resources have been authorized according to a per-subscriber application level policy;
determine whether reservation and commitment of the one or more resources have been authorized according to the per-subscriber application level policy for application level authorization;
implement a per-subscriber bearer level policy for bearer level authorization or implement the per-subscriber application level policy in response to the determination by:
if reservation and commitment of the one or more resources have been authorized, over-ruling the per-subscriber bearer level policy for bearer level authorization with the per-subscriber application level policy for application level authorization;
otherwise, negotiating the per-subscriber application level policy for application level authorization with the per-subscriber bearer level policy for bearer level authorization in response to the determination.

2. The apparatus of claim 1, a per-subscriber application level authorization statically configured on the application element.

3. The apparatus of claim 1, the authorization of the one or more resources indicating that resource reservation and commit requests have been authorized at an application level.

4. The apparatus of claim 1, the processors further operable to:
communicate with a database storing the per-subscriber bearer level policy.

5. The apparatus of claim 1, the processors operable to implement the per-subscriber bearer level policy or the per-subscriber application level policy by:
communicating with a policy enforcement point.

6. The apparatus of claim 1, the authorization information comprising a flag indicating that the one or more resources have been authorized according to the per-subscriber application level policy.

7. A method comprising:
receiving authorization information from an application element, the authorization information indicating whether one or more resources have been authorized according to a per-subscriber application level policy;
determining, by one or more processors, whether reservation and commitment of the one or more resources have been authorized according to the per-subscriber application level policy for application level authorization;
implementing, by the one or more processors, a per-subscriber bearer level policy for bearer level authorization or implement the per-subscriber application level policy in response to the determination by:
if reservation and commitment of the one or more resources have been authorized, over-ruling the per-subscriber bearer level policy for bearer level authorization with the per-subscriber application level policy for application level authorization;
otherwise, negotiating the per-subscriber application level policy for application level authorization with the per-subscriber bearer level policy for bearer level authorization in response to the determination.

8. The method of claim 7, further comprising:
configuring a per-subscriber application level authorization on the application element.

9. The method of claim 7, the authorization of the one or more resources indicating that resource reservation and commit requests have been authorized at an application level.

10. The method of claim 7, further comprising:
communicating with a database storing the per-subscriber bearer level policy.

11. The method of claim 7, the implementing the per-subscriber bearer level policy or the per-subscriber application level policy further comprising:
communicating with a policy enforcement point.

12. The method of claim 7, the authorization information comprising a flag indicating that the one or more resources have been authorized according to the per-subscriber application level policy.

13. Software embodied in a non-transitory computer readable medium and comprising code such that when executed is operable to:

receive authorization information from an application element, the authorization information indicating whether one or more resources have been authorized according to a per-subscriber application level policy;

determine whether reservation and commitment of the one or more resources have been authorized according to the per-subscriber application level policy for application level authorization;

implement a per-subscriber bearer level policy for bearer level authorization or implement the per-subscriber application level policy in response to the determination by:

if reservation and commitment of the one or more resources have been authorized, over-ruling the per-subscriber bearer level policy for bearer level authorization with the per-subscriber application level policy for application level authorization;

otherwise, negotiating the per-subscriber application level policy for application level authorization with the per-subscriber bearer level policy for bearer level authorization in response to the determination.

14. The medium of claim 13, wherein the code is further operable to:

configure a per-subscriber application level authorization on the application element.

15. The medium of claim 13, the authorization of the one or more resources indicating that resource reservation and commit requests have been authorized at an application level.

16. The medium of claim 13, wherein the code is further operable to:

communicate with a database storing the per-subscriber bearer level policy.

17. The medium of claim 13, the authorization information comprising a flag indicating that the one or more resources have been authorized according to the per-subscriber application level policy.

\* \* \* \* \*